United States Patent [19]
Banks

[11] Patent Number: 5,344,269
[45] Date of Patent: Sep. 6, 1994

[54] AUTOMATIC RETRIEVAL SYSTEM

[76] Inventor: Edward J. K. Banks, 1 Fox Close, Wigginton, Tring, Hertfordshire, HP23 6ED, England

[21] Appl. No.: 968,325

[22] Filed: Oct. 29, 1992

[30] Foreign Application Priority Data

Oct. 29, 1991 [GB] United Kingdom ............ 9122918.7
Nov. 19, 1991 [GB] United Kingdom ............ 9124681.9

[51] Int. Cl.$^5$ .............................................. B65G 1/04
[52] U.S. Cl. .................................. 414/273; 414/283
[58] Field of Search .............................. 414/266–268, 414/273, 281, 283

[56] References Cited

U.S. PATENT DOCUMENTS

| 3,497,088 | 2/1970 | Lemelsor | 414/283 X |
| 3,499,554 | 3/1970 | Davis et al. | 414/283 |
| 3,526,324 | 9/1970 | Outinen | 414/266 |
| 3,691,398 | 9/1972 | Burch | 414/268 X |
| 3,888,365 | 6/1975 | Reimann et al. | 414/266 |
| 4,717,305 | 1/1988 | Edwards | 414/268 X |
| 4,808,059 | 2/1989 | Eddy | 414/283 X |
| 5,020,958 | 6/1991 | Tuttobene | 414/281 |
| 5,096,357 | 3/1992 | Galbani | 414/273 X |
| 5,156,513 | 10/1992 | Galan et al. | 414/273 |
| 5,178,506 | 1/1993 | Meschi | 414/281 X |

FOREIGN PATENT DOCUMENTS

| 212125 | 10/1968 | U.S.S.R. | 414/266 |
| 2206570 | 1/1989 | United Kingdom | 414/266 |

Primary Examiner—David A. Bucci
Attorney, Agent, or Firm—Watson, Cole, Grindle & Watson

[57] ABSTRACT

An automatic retrieval system for retrieving selected articles, such as articles of clothing, provided on hangers at predetermined storage locations arranged in rows includes a transporter moving along a path above the row of storage locations for transporting retrieved articles to a delivery point. The transporter has a pivotal arm for moving retrieved hangers clear of the other hanging articles and for rotating the retrieved hangers so as to be transported end-on, thus producing a compact storage/retrieval facility. A pick-off/gripping device is provided at the end of the transporter arm for disengaging the selected hangers from the storage location at which they are held. Where the hangers are suspended from slots in a rail, the transporter may carry magnetic field detectors for detecting the open tops of the slots.

24 Claims, 2 Drawing Sheets

AUTOMATIC RETRIEVAL SYSTEM

BACKGROUND AND SUMMARY OF THE INVENTION

The present invention relates to an automatic retrieval system. More particularly, the invention concerns the automatic retrieval of one or more selected items from among a set of items stored at respective known locations.

The following description is given in terms of the automatic retrieval of selected garments retained on hangers in a storage area; however, is to be understood that the invention is more generally applicable.

There are several known systems for the storage and automatic retrieval of garments. Such systems may be broadly classified into two groups by reference to the type of retrieval system which is used.

In the first group of systems, the garments are provided in a movable storage facility so that the whole set of storage locations moves (usually by rotation) until a selected garment is adjacent to a delivery point where it is manually or automatically picked off. An example of a system in this first category is described in British patent No. 1107988. In the second group of systems, the garments are provided at stationary storage locations and there is a retrieval device which is moved to the known location of a selected garment, picks off the selected garment and then delivers it to a delivery point. An example of a system of the second type is described in British patent No. 1317306.

In general the second type of storage and retrieval system is preferable over the first type because less power is required and quicker retrieval is obtained by moving only the retrieval device rather than moving the whole set of stored garments.

In the system described in GB 1317306 the garments are arranged on hangers which are suspended on storage rails via hanger clips. The hanger clips have a loop at one end, an enlarged head at the other and a connecting stalk between the two ends. The hook of each hanger is threaded through the loop at the bottom end of a hanger clip. The stalk of each hanger clip is slid into a slot in a storage rail and the enlarged head at the top of the clip rests on the rail.

In this known system, rails are provided in pairs and the retrieval device is an overhead pick off gantry which moves along a straight track midway between the two rails. The motion of the gantry is microprocessor controlled so as to correctly line up the gantry with the known storage location at which a selected garment is held. Once at the correct location, a lower portion of the gantry slides sideways and lifts the head of the relevant hanger clip using the inclined plane principle. The lower gantry portion plus selected garment slides back to the running track and then the gantry is conveyed to one end of the track which serves as a delivery point. After the delivered garment is returned to a customer, the hanger clip is ejected and is then available for re-use.

Although this prior art system has been demonstrated to be operable (by being implemented as an automatic dry cleaning system and as a uniform exchange system by Autovalet Systems International), it wastes space in the gap provided between the pair of rails, and thus the system as a whole occupies an undue amount of space. Furthermore, the speed of garment retrieval is restricted in the prior art system because of the relatively great weight of the retrieval device. Also, by making use of hanger clips, the complexity of the system is increased and the weight of the load to be carried by the retrieval device is increased further, slowing garment delivery.

GB-A-2155451 describes a garment retrieval similar to that of GB 1317306. Both systems use as the retrieval device a gantry moving between and selecting garments from a parallel pair of storage rails. Also, in both systems hanger clips are used to suspend the hangers from the storage rails. However, in the system of GB-A-2155451 the hanger holding a selected garment is rotated to a position at which it is held edgewise for transportation. This is achieved by means of a rigid loop member which is carried by the retrieval device. In its normal position the loop is above the level of the storage rails. However the loop may be swung down (through the action of an electric motor carried by the retrieval device) so that the loop will push against a suspended garment and cause it to turn into the edgewise orientation.

The present invention provides an improved storage and retrieval system of the second general type described above but which is simpler, lighter and more compact than prior art systems. The light weight of the retrieval device used in embodiments of the present invention means that the speed of delivery of a selected item is considerably enhanced.

In a first aspect the present invention provides apparatus for retrieving articles from predetermined storage locations and delivering the articles to a delivery point, the articles being provided on hangers, the apparatus comprising:

a row of storage locations, each storage location being adapted to enable one or more of said hangers to be removably held there in a first orientation;

control means for designating the storage location at which is located one or more of said articles to be retrieved;

means for removing one or more hangers from the designated storage location, the removal means being adapted to disengage said one or more hangers from the designated storage location and to move the one or more hangers into a second orientation for transportation, the second orientation being transverse to the first orientation in which hangers are held at storage locations; and a transporter for transporting the one or more removed hangers from the designated location to the delivery point;

wherein the removal means is adapted to contact the hangers to disengage the hangers from the designated storage location.

An advantage provided by the first aspect of the invention is that hanging items may be retrieved by direct removal of the hanger, thus avoiding the use of intermediate hanging clips. This simplifies the overall system and somewhat lightens the load to be transported.

In a second aspect the present invention provides apparatus for retrieving articles from predetermined storage locations and delivering the articles to a delivery point, the articles being provided on hangers, the apparatus comprising:

a row of storage locations, each storage location being adapted to enable one or more of the hangers to be removably held there in a first orientation;

control means for designating the storage location at which is located one or more of the articles to be retrieved;

means for removing one or more hangers from the designated storage location, the removal means being adapted to disengage the one or more hangers from the designated storage location and to move the one or more hangers into a second orientation for transportation, the second orientation being transverse to the first orientation in which hangers are held at storage locations;

a transporter for transporting the one or more removed hangers from the designated location to the delivery point; and a path substantially directly above the row of storage locations, the transporter being adapted to move along the path.

An advantage of the second aspect of the invention is that the transporter is lighter and more compact than in the prior art systems. This speeds retrieval and delivery of selected articles. Furthermore, in a system using multiple storage rails, the speed of retrieval of selected garments is considerably faster if there is one transporter per rail as in the present invention. This is in contrast to the prior art systems in which one transporter is used to serve a pair of rails.

In a third aspect the present invention provides apparatus for retrieving articles from predetermined storage locations and delivering the articles to a delivery point, the articles being provided on hangers, the apparatus comprising:

a row of storage locations, each storage location being adapted to enable one or more of the hangers to be removably held there in a first orientation;

control means for designating the storage location at which is located one or more of the articles to be retrieved;

means for removing one or more hangers from the designated storage location, the removal means being adapted to disengage the one or more hangers from the designated storage location and to move the one or more hangers into a second orientation for transportation, the second orientation being transverse to the first orientation in which hangers are held at storage locations; and a transporter for transporting the one or more removed hangers from the designated location to the delivery point;

wherein the transporter is provided with at least one sensor for detecting storage locations as they are passed by the transporter;

the row of storage locations comprises a row of slots provided in a rail; and the sensor(s) provided on the transporter are magnetic field sensors arranged to detect the discontinuities caused by the tops of the slots in the rail.

An advantage provided by the third aspect of the invention is that a high degree of positioning accuracy is achieved. This allows the stored articles to be spaced closer together along the storage rail.

BRIEF DESCRIPTION OF THE DRAWINGS

A preferred embodiment of the invention will be described by way of example with reference to the accompanying drawings in which.

DETAILED DESCRIPTION OF THE PREFERRED EMBODIMENTS

This invention will be described with respect to a specific embodiment in which articles of clothing hanging on conventional coat hangers are to be retrieved. It is understood however that the invention is applicable to the retrieval of any appropriately stored items.

Figure 1:
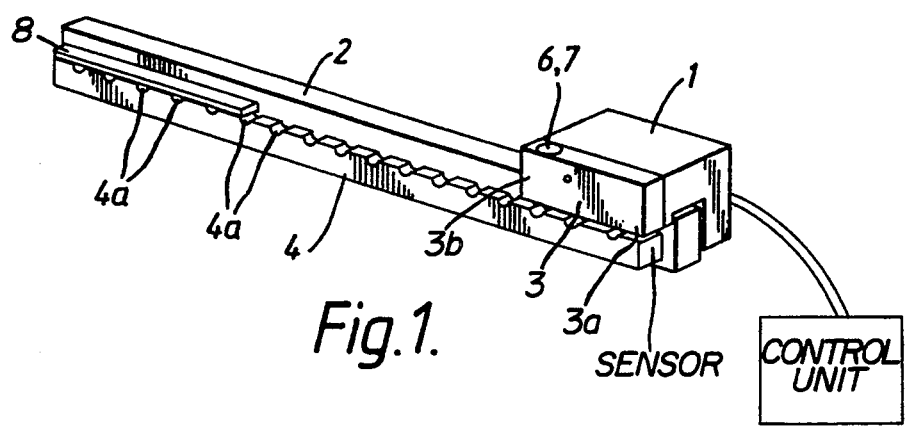
FIG. 1 is a schematic perspective view of the preferred embodiment.

A schematic perspective view of the preferred embodiment of the invention is shown in FIG. 1. A transporter 1 is designed to be mounted on and move along rail 2. Attached to transporter 1 is arm 3 having a first end 3a and a second end 3b. At end 3b is fixed a pick-off mechanism 7 which, at the appropriate time, is caused to move downwards, so that a gripping device 6 may engage the heads of hangers, and upwards to lift the hangers prior to their transportation. The motion of the gripper device under electrical or electronic control may be effected using any suitable means, such as a solenoid. The arm 3 is mounted on transporter 1 such that it may pivot about a vertical axis passing through first end 3a whereby arm 3 may be rotated to be substantially normal to rail 2, when viewed from above.

There is also arranged beneath arm 3 and parallel to rail 2 a slotted hanging rail 4. This is illustrated as being mounted on rail 2. Along rail 4 are a plurality of slots 4a. Slots 4a define positions at which hangers are hung to store articles and from which articles may be retrieved. In a practical embodiment of the invention many more slots 4a than are shown in FIG. 1 may be provided. It is envisaged that apparatus having a capacity to store hundreds of articles may be constructed according to this invention.

Transporter 1 may be constructed to move along rail 2 in any practical manner, but a preferred arrangement is that transporter 1 should have wheels to run along rail 2. Transporter 1 may be moved by a wire rope (not shown) attached to each end of transporter 1, passing round a pulley (not shown) at one end of rail 2 and driven by an electric motor (not shown) at the other end of rail 2. Such an arrangement allows transporter 1 to have a light construction which allows faster movement and hence faster retrieval of the stored articles.

Figures 2A, 2B, 2C, 2D, 2E:
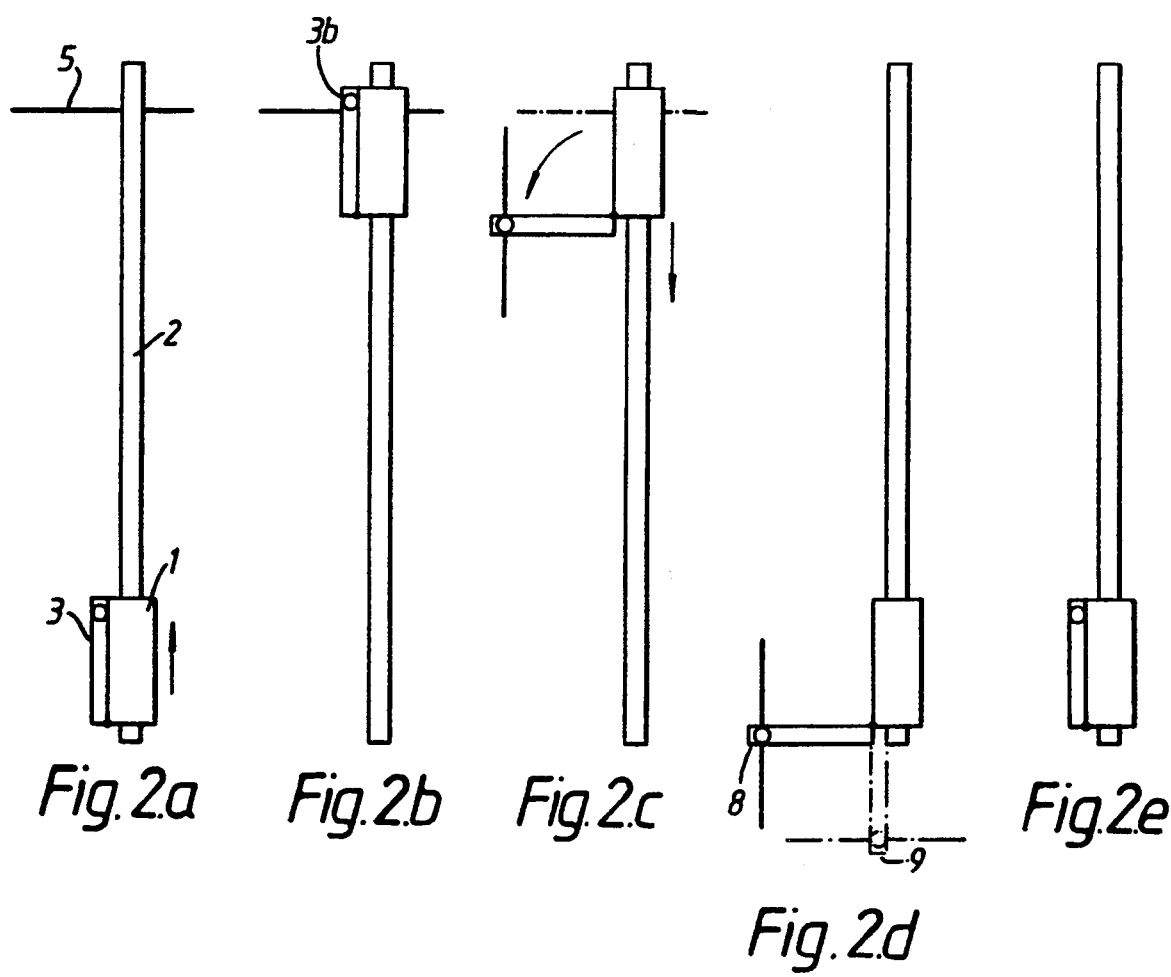
FIGS. 2a–2e illustrate the operation of the preferred embodiment.

The retrieval of a required item hanging on rail 4 will be described with reference to FIGS. 2a–2e which are schematic plan views of the apparatus shown in FIG. 1. Initially transporter 1 is moved along rail 2 (FIG. 2a) to a position in which second end 3b of arm 3 is positioned above the required item, represented by numeral 5 (FIG. 2b). The pick-off device 7, to which is attached the gripping device 6, is lowered to a position where the gripper 6 holds the hanger tip(s) in the appropriate slot 4a. Pick-off 7 is then raised for hanger transportation. Arm 3 is then rotated about its axis of rotation (FIG. 2c). This movement moves the hanger away from hanging rail 4 and swings the required item clear of other garments hanging on rail 4, it also orients the hanger end-on for transportation thus minimising the space required for hanger transportation.

Transporter 1 may then be moved along rail 2 carrying with it the required garment to a delivery position which may be located at the end of the hanging rail (position 8), or beyond the hanging rail (position 9) by causing arm 3 to rotate a further 90 at the delivery point (FIG. 2d). After removal of the garment from the gripping device, whether by hand or by automatic opening of the gripper jaws, the arm 3 may again rotate about its axis of rotation to return to its original, resting position parallel to rail 2 (FIG. 2e).

The rotation of the garment through 90° for transporting provides a considerable space saving compared to prior art arrangements in which the garments are simply moved sideways away from the hanging rail but not rotated prior to being transported to the delivery point. The arrangement of the present invention is also quite compact due to the fact that the rail on which the transporter moves may be positioned substantially above the hanging rail.

Figure 3:
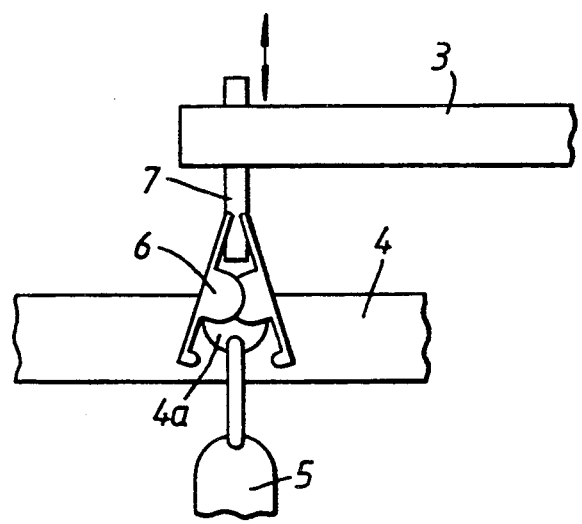
FIG. 3 illustrates in greater detail a particular feature of the preferred embodiment.

The gripping device of the preferred embodiment is illustrated in FIG. 3. It is to be understood that the illustrated gripper may be replaced by any suitable gripping device commonly used in robotics.

FIG. 3 is a schematic view of a section of hanging rail 4 with garment 5 hanging in a slot 4a. Arm 3 is shown with the pick-off 7, attached to end 3b, in its lowered position. The pick-off 7 bears a gripping device 6 which comprises two members pivoted with respect to each other to form jaws which pass over the hanger in slot 4a.

As will be appreciated, lifting of the garment is effected by closing the jaws of gripping device 6 to enclose the hanger in slot 4a and raising the pick-off 7. Arm 3 may then be pivoted as described above to move the required garment away from rail 4. Due to the nature of the gripping device 6 it is possible for a number of garments to be retrieved simultaneously. The garments required together are all hung on hangers in the same slot 4a and the jaws of the gripping device close over all the hangers at the same time hence enabling retrieval of all of the garments.

The jaws of gripping device 6 may be automatically actuated in any convenient manner. In an alternative construction, the gripping device may be provided with jaws which are biassed together so that as the gripper is lowered past the hanger slot 4a the hanger tip(s) force the jaws apart and the jaws spring shut underneath the hanger tip(s). In such a construction means for releasing the hanger(s) from the gripping device 6 would be provided at the delivery point.

As will be discussed further below, a controller controls movement of the transporter, positioning of the transporter for garment pick-off, the action of pick-off by the gripper and, if required, automatic release of the transported garment(s). It is preferable that the controller should be carried by the transporter but should be a separate unit. In this way the weight of the transporter can be kept low.

Signals between the controller and the transporter may be conveyed by any suitable means. For example, a physical link, such as a travelling cable, between the controller and the transporter could be used. It is also conceivable that the signals could be conveyed by radio signals or the like. However the requirement for light weight of the transporter means that the radio transceiver it carries would need to be particularly light.

A further preferred feature is the addition of a retention strip 8 running along the top of rail 4 (see FIG. 1). This is simply a strip of material along rail 4 closing slots 4a. Garments may still be retrieved by lifting the hanger within slot 4a and then moving the hanger sideways with respect to rail 4, but the retention strip acts to prevent the disturbance of neighbouring garments which are not being retrieved and to retain such garments on the rail 4.

In a typical practical embodiment of this invention slots 4a are 5 mm wide, 30 mm high and 10 mm deep, that being the width of rail 4. The 5 mm width allows up to five conventional hangers to be hung in a single slot, the 30 mm height allows a 15-20 mm lift giving adequate clearance for moving the hanger away from the rail and the depth of 10mm prevents twisting of the hangers beyond 30 from their position at right angles to rail 4. Typically the gripping device is lowered 40 mm from its rest position to grip the required hangers, and then raised 20 mm to transport the garments.

In order to move the transporter to the correct position to retrieve the required garment the apparatus is provided with a means for identifying the correct hanging position. It is possible to use the rotational position of the wire driving pulley to infer the hanging position, but more direct methods may be used involving sensing the hanging positions. One method of sensing hanging positions is to assign a unique code to each hanging position and indicate this in a manner such that a sensor on the transporter may read the code as the transporter moves. Bar coding of positions is a recognized way of achieving this. A more direct method is to sense hanging positions directly and count them from a reference point. This is the preferred method.

In order to perform this preferred method the transporter 1 carries a pair of magnetic field sensors mounted in line with the slots 4a and spaced by the same amount, e.g., 20 mm. They are positioned underneath the transporter close to the arm. They detect the discontinuities caused by open tops of the hanging slots when the transporter is in motion which may then be counted. The use of two sensors located in the specified manner gives a means of detecting when either sensor is faulty or generates a false indication.

As mentioned above, the motion of the transporter to locations where selected items may be retrieved or delivered is controlled by a main control unit. It is this main control unit which processes the signals from the hanging position sensors to determine where the transporter is. In order to keep the weight of the transporter mechanism low it is preferred to keep the main control unit separate from the transporter.

The total electrical power supplied to the transporter 1 in the preferred embodiment, to operate the transporter position sensors, the pick-off and gripping device and the arm actuator, is low and may be supplied by a low voltage supply, e.g., 24 or 48 volt, fed to the transporter by means of a travelling cable. Preferably this travelling cable will also carry the control and operational signals between the transporter and pick-off mechanism and the main control unit.

As described above this invention relates to the mechanics of retrieving sorted items and in particular items of clothing. The invention may be incorporated into any of the known uses in the prior art, e.g. dry cleaning services, uniform storage in hospitals or other workplaces, with appropriate known control technology for detecting when an item should be retrieved and which item it should be.

The detailed arrangement discussed above allows hangers to be removed manually, or automatically, at either of the two delivery positions 8 and 9. However, since the gripping device is preferably activated electrically, hangers may be dropped on to a slip rail or conveyor belt at any point in the transporter's travel or at the ends of the storage rails.

In the detailed embodiment discussed above a pickoff and gripping mechanism is provided to remove hangers from the slots where they are located. Other means may be used to obtain the same function, for example, a gripping device may be provided mounted directly on the end 3b of arm 3 and the necessary lowering and raising of the gripper may be achieved by pivoting of the arm 3 in a substantially vertical plane about its end 3a.

Multiple storage rails may be mounted side by side and/or end-to-end with transporters right and/or left-handed and paired so as to share common delivery points.

Within certain limits the storage rails may be inclined relative to the horizontal, thus increasing the versatility of the system.

I claim:

1. Apparatus for retrieving articles from predetermined storage locations and delivering said articles to a delivery point, the articles being provided on hangers having heads, the apparatus comprising:
   a row of storage locations, each storage location being adapted to enable one or more of said hangers to be removably held there in a first orientation;
   control means comprising a control unit for designating the storage location at which is located one or more of said articles to be retrieved;
   means for removing one or more hangers from the designated storage location, the removal means comprising gripping means operable to grip the head(s) of the one or more hangers held at the designated storage location and to be raised whereby to disengage said one or more hangers from the designated storage location and moving means for moving said one or more hangers into a second orientation for transportation, said second orientation being transverse to the first orientation in which hangers are held at storage locations; and
   a transporter for transporting the one or more removed hangers from the designated location to the delivery point.

2. Apparatus according to claim 1, wherein the removing means is carried by and moves with the transporter and the transporter is a monorail device adapted to move along a path substantially directly above said row of storage locations.

3. Apparatus according to claim 1, wherein the control means comprises at least one sensor carried by the transporter for detecting storage locations as they are passed by the transporter, the row of storage locations comprises a row of slots causing discontinuities in a surface of a rail, the sensor(s) provided on the transporter being magnetic field sensors arranged to detect said discontinuities in the rail and to output a signal indicative to detection of a discontinuity and the control unit is further adapted for counting said output signals whereby to determine how far along the rail the transporter has travelled.

4. Apparatus according to claim 3, wherein a retention strip is provided along the top of the rail, at least partially covering the discontinuities caused by the slots, whereby to hinder inadvertent removal of hangers from the storage locations.

5. Apparatus according to claim 2, wherein the moving means comprises an arm having a pivot end and an end remote from the pivot end, wherein said arm is mounted on the transporter for pivotal movement about said pivot end whereby to enable disengaged hangers to be moved into the second orientation for transportation.

6. Apparatus according to claim 5, wherein the removing means further comprises a pickoff device mounted at the end of the transporter arm remote from the pivot end, wherein the gripping means is adapted to be lowered and raised by the pick-off device.

7. Apparatus according to claim 5, wherein the row of storage locations has an end, the delivery point being located beyond said end of the row of storage locations, and the transporter arm is adapted for further rotation when the transporter is at said one end of the row of storage locations so that the delivery point may be reached.

8. Apparatus according to claim 1, wherein the apparatus is adapted to retrieve articles of clothing provided on hangers.

9. Apparatus for retrieving articles from predetermined storage locations and delivering said articles to a delivery point, the articles being provided on hangers having heads, the apparatus comprising:
   a row of storage locations, each storage location being adapted to enable one or more of said hangers to be removably held there in a first orientation;
   control means comprising a control unit for designating the storage location at which is located one or more of said articles to be retrieved;
   means for removing one or more hangers from the designated storage location, the removal means being adapted to disengage said one or more hangers from the designated storage location and to move said one or more hangers into a second orientation for transportation, said second orientation being transverse to the first orientation in which hangers are held at storage locations;
   a transporter for transporting the one or more removed hangers from the designated location to the delivery point, wherein the removing means is carried by and moves with the transporter and the transporter is a monorail device adapted to move along a path substantially directly above said row of storage locations.

10. Apparatus according to claim 9, wherein the control means comprises at least one sensor carried by the transporter for detecting storage locations as they are passed by the transporter and the row of storage locations comprises a row of slots causing discontinuities in a surface of a rail, sensor(s) provided on the transporter being magnetic field sensors arranged to detect the discontinuities in the rail and to output a signal indicative of detection of a discontinuity and the control unit is further adapted for counting said output signals whereby to determine how far along the rail the transporter has travelled.

11. Apparatus according to claim 10, wherein a retention strip is provided along the top of the rail, at least partially covering the discontinuities caused by the slots, whereby to hinder inadvertent removal of hangers from storage locations.

12. Apparatus according to claim 9, wherein the removing means comprises an arm having a pivot end and an end remote from the pivot end, the arm being mounted on the transporter for pivotal movement about said pivot end whereby to enable disengaged hangers to be moved into the second orientation for transportation.

13. Apparatus according to claim 12, wherein the removing means comprises gripping means for disengaging said one or more hangers from the designated location, the gripping means being operable to grip the head(s) of one or more hangers and being arranged for raising to disengage said hangers from the designated storage location.

14. Apparatus according to claim 13, wherein the removing means further Comprises a pickoff device mounted at the end of the transporter arm remote from the pivot end, wherein the gripping means is adapted to be lowered and raised by said pick-off device.

15. Apparatus according to claim 12, wherein the row of storage locations has an end, the delivery point being located beyond said end of the row of storage locations, and the transporter arm is adapted for further rotation when the transporter is at said one end of the row of storage locations so that the delivery point may be reached.

16. Apparatus according to claim 9, wherein the apparatus is adapted to retrieve articles of clothing provided on hangers.

17. Apparatus for retrieving articles from predetermined storage locations and delivering said articles to a delivery point, the articles being provided on hangers, the apparatus comprising:
 a plurality of rows of storage locations, each storage location being adapted to enable one or more of said hangers to be removably held there in a first orientation;
 control means comprising a control unit for designating the storage location at which is located one or more of said articles to be retrieved;
 for each row of storage locations, means for removing one or more hangers from the designated storage location, the removal means being adapted to disengage said one or more hangers from the designated storage location and to move said one or more hangers into a second orientation for transportation, said second orientation being transverse to the first orientation in which hangers are held at storage locations; for each row of storage locations, a transporter for transporting the one or more removed hangers from the designated location to the delivery point;
 wherein each removing means is carried by and moves with a respective transporter and each transporter is a monorail device adapted to move along a path substantially directly above a respective row of storage locations.

18. Apparatus for retrieving articles from said predetermined storage locations and delivering said articles to a delivery point, the articles being provided on hangers having heads, the apparatus comprising:
 a row of storage locations, each storage location being adapted to enable one or more of said hangers to be removably held there in a first orientation;
 control means comprising a control unit for designating the storage location at which is located one or more of said articles to be retrieved;
 means for removing one or more hangers from the designated storage location, the removal means being adapted to disengage said one or more hangers from the designated storage location and to move said one or more hangers into a second orientation transverse to the first orientation in which hangers are held at storage locations; and
 a transporter for transporting the one or more removed hangers from the designated location to the delivery point;
 wherein the control means further comprises at least one sensor carried by the transporter for detecting storage locations as they are passed by the transporter;
 a row of storage locations comprises a row of slots causing discontinuities in a surface of a rail; and
 the sensor(s) provided on the transporter are magnetic field sensors arranged to detect the discontinuities caused by the slots in said rail.

19. Apparatus according to claim 18, wherein a retention strip is provided along the top of the rail, at least partially covering the discontinuities caused by the slots, whereby to hinder inadvertent removal of hangers from storage locations.

20. Apparatus according to claim 18, wherein the removing means is carried by and moves with the transporter and comprises an arm having a pivot end and an end remote from the pivot end, wherein said arm is mounted on the transporter for pivotal movement about said pivot end whereby to enable disengaged hangers to be moved into the second orientation for transportation.

21. Apparatus according to claim 20, wherein the removing means comprises gripping means for disengaging said one or more hangers from the designated location, the gripping means being operable to grip the heads of said one or more hangers and being arranged for raising to disengage said hangers from the designated storage location.

22. Apparatus according to claim 21, wherein the removing means further comprises a pickoff device mounted at the end of the transporter arm remote from the pivot end, wherein the gripping means is adapted to be lowered and raised by the pick-off device.

23. Apparatus according to claim 20, wherein the row of storage locations has an end, the delivery point being located beyond said end of the row of storage locations, and the transporter arm is adapted for further rotation when the transporter is at said one end of the row of storage locations so that the delivery point may be reached.

24. Apparatus according to claim 18, wherein the apparatus is adapted to retrieve articles of clothing provided on hangers.

* * * * *